J. G. P. THOMAS.
IGNITION OF INTERNAL COMBUSTION ENGINES.
APPLICATION FILED DEC. 22, 1915.

1,301,985.

Patented Apr. 29, 1919.
3 SHEETS—SHEET 1.

Inventor:
John G. P. Thomas
per Herbert Sefton Jones
Attorney

J. G. P. THOMAS.
IGNITION OF INTERNAL COMBUSTION ENGINES.
APPLICATION FILED DEC. 22, 1915.
1,301,985.
Patented Apr. 29, 1919.
3 SHEETS—SHEET 2.
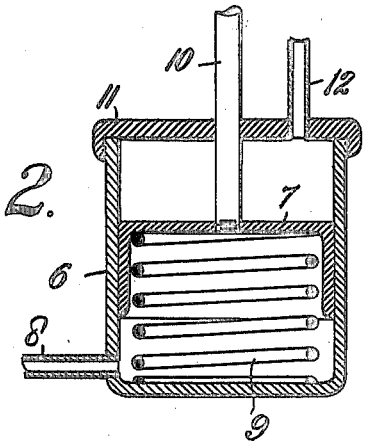
Fig: 2.
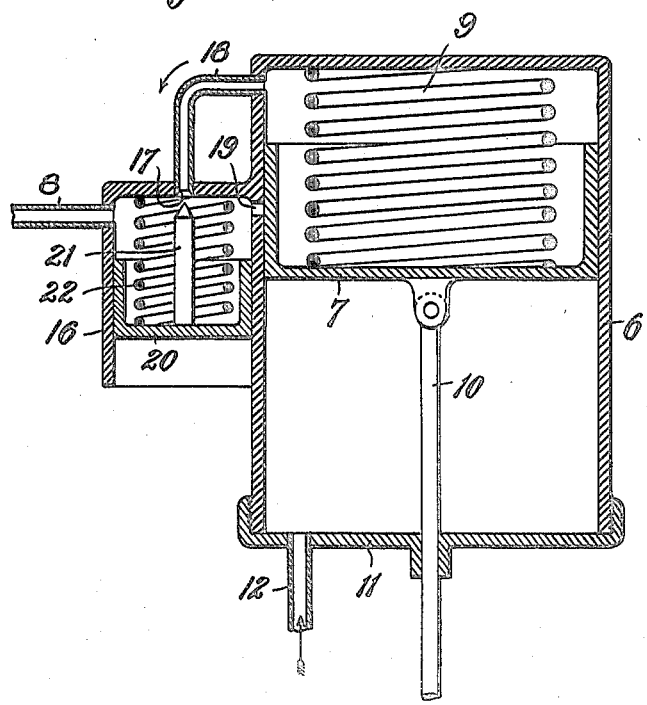
Fig: 5.
Inventor
John Godfrey Parry Thomas
per. Herbert Sefton Jones
Attorney Inventor
John Godfrey Parry Thomas
per Herbert Sefton Jones
Attorney

UNITED STATES PATENT OFFICE.

JOHN G. P. THOMAS, OF KENSINGTON, LONDON, ENGLAND, ASSIGNOR TO THOMAS FOREIGN PATENTS LIMITED, OF KENSINGTON, LONDON, ENGLAND, A CORPORATION OF GREAT BRITAIN.

IGNITION OF INTERNAL-COMBUSTION ENGINES.

1,301,985.          Specification of Letters Patent.      Patented Apr. 29, 1919.

Application filed December 22, 1915. Serial No. 68,180.

*To all whom it may concern:*

Be it known that I, JOHN GODFREY PARRY THOMAS, a subject of the King of Great Britain, residing at 14 Leonard Place, High street, Kensington, in the county of London, England, have invented new and useful Improvements in the Ignition of Internal-Combustion Engines, of which the following is a specification.

The invention relates to controlling automatically the ignition in internal combustion and similar engines.

Most commonly at the present time the ignition of such engines is most easily controlled by adjustment of the spark advancing lever of the magneto which serves for the ignition.

With one exception which will be dealt with below it is desirable to cause the ignition to advance substantially in proportion with increase in the vacuum or suction in the engine induction pipe.

Broadly conceived, therefore, the present invention consists in providing a connection between the ignition controlling means and a mechanism sensitive to changes in the pressure or vacuum in the engine induction pipe. More particularly defined the invention consists in a pipe connection between the engine induction pipe and a cylinder with a movable piston or its equivalent, said piston being in operative connection with a magneto rocker lever so that upon increase in suction the consequent movement of said piston advances the magneto ignition.

A further object of the invention consists in a pipe of comparatively small bore connected with the induction pipe on the engine side of the throttle valve and leading to the cylinder space of a controlling cylinder the piston of which is linked to the magneto rocker lever. The cylinder space is of relatively large volume in comparison with the bore of the connecting pipe so that any hunting effect or oscillating in the controlling piston is done away with.

A further object of the invention is to increase the sensitiveness of such controlling arrangement. For this purpose the invention provides that the pipe connected to the engine induction pipe projects into the latter, being bent around toward the valve ports of the engine cylinder and formed at its end with properly directed holes, indentations and so forth, so as to increase in well understood fashion, the injector effect of the gas or vapor proceeding past the end of said pipe to the engine cylinders. In accordance with the invention the sensitiveness may be further increased by allowing the pressure of the engine exhaust to act upon the controlling piston from the opposite side to that upon which the suction acts. A pipe is led from the engine exhaust pipe to convey the exhaust pressure to the proper side of the controlling piston.

The present invention in a further object deals with an objection which might possibly be raised to this simple apparatus. In its most simple form as set out above the apparatus might operate in an undesired manner when the engine is turning around slowly either light or on small load. As will be recognized by practitioners in the art to which the invention belongs, that these circumstances would conduce to a very large vacuum or suction in the engine induction pipe larger than under any other circumstances imaginable. It might not be desirable in these circumstances to have the ignition extremely advanced as would be the result in the simple apparatus above set forth. Yet a further main object of the invention therefore comprises means for avoiding this difficulty.

The invention provides means for allowing the control piston in the control cylinder to be freely operated upon by the suction in the induction pipe under normal conditions, but when the suction increases unduly, for example in the circumstances above mentioned, means are automatically brought into operation for cutting off the free connection between the engine induction pipe and the controlling cylinder until the latter has retarded the ignition to a predetermined extent. For example the pipe conducting the suction of the engine to the control cylinder space may pass through an auxiliary cylinder having a piston which is operated only under abnormal circumstances when it cuts off the direct connection between the engine induction pipe and the control cylinder space, only allowing connection through a port in the control cylinder wall which is closed by the control piston when the latter advances the ignition beyond a predetermined amount. Hence in these special circumstances the ignition is prevented from being advanced beyond this pre-determined amount which is fixed by the position of the port in the cylinder wall.

The invention provides an alternative manner of effecting the same result by providing a cylindrical extension to the main control piston, said extension containing a subsidiary piston adapted to operate differentially to the main control piston and linked to the ignition advancing mechanism. The subsidiary piston only exerts a differential effect in the abnormal circumstances referred to. In normal circumstances both pistons move together as an integral unit and the system works in the manner of the simple system first referred to. In abnormal circumstances the auxiliary piston has an independently differential movement and prevents the ignition from being fully advanced.

A number of embodiments of the present invention are illustrated in the accompanying drawings, in which Figure 1 shows diagrammatically in elevation a two-cylinder internal combustion engine with a simple form of the invention applied thereto.

Fig. 1ª is similar to Fig. 1, showing in addition the correlated control of the throttle valve.

Fig. 2 is a diagrammatic section of one device for increasing the sensitiveness of the apparatus.

Fig. 5 is a diagrammatic vertical section of one construction of apparatus adapted to prevent excessive advance of ignition when the engine is turning slowly on no load.

Figure 1:
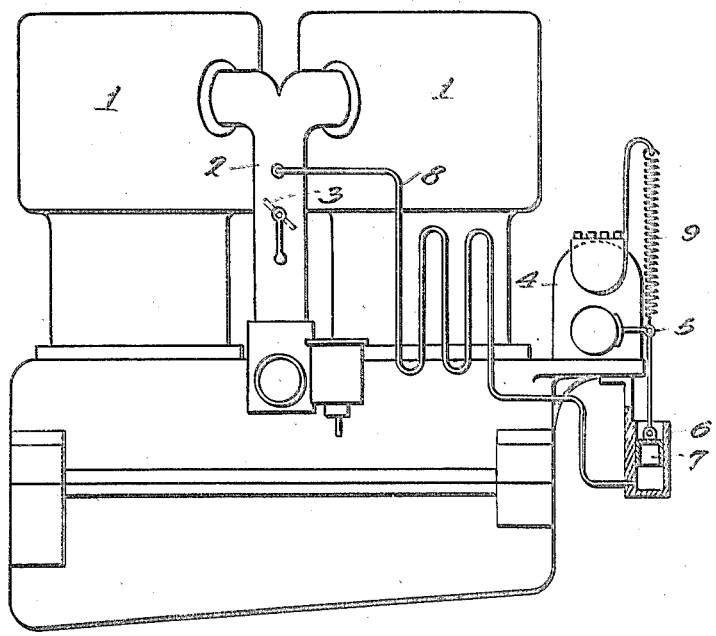
Figure 1A:
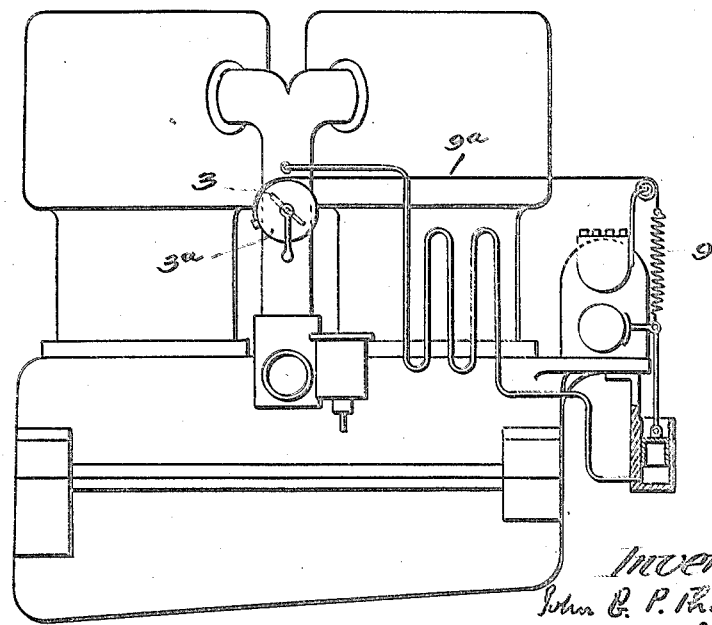

In Fig. 1 of the drawings, 1, 1 are the cylinders of an internal combustion engine, 2 is its induction pipe which branches to the respective cylinders and contains at 3 a throttle valve operable in the usual manner. 4 is magneto of the engine. As a rule the time of sparking is controlled by a lever 5 which is operable from the driver's seat in the case of an engine on a vehicle. According to the present invention the spark control lever is operated automatically according to the pressure in the induction pipe 2. For this purpose there is provided an auxiliary cylinder 6 in which slides a piston 7 connected with the lever 5. The cylinder is joined by a tube 8 to a point in the induction pipe intermediate between the branching of the pipe and the throttle valve 3. The vacuum in the cylinder 6 tends to draw the lever 5 downward so as to advance the ignition while the pull of the piston is resisted, for instance by a suitably adjusted spiral spring 9.

For some engines the pipe 8 has to be made of considerable length and small bore so that its area is not large in comparison with the area of the cylinder 6. Hence slight movement of the piston 7 involves a setting in motion of a considerable volume of gas in the tube at a high velocity. This tends to damp down oscillations of the spark control lever which might otherwise occur. A dash-pot could of course be employed to the same end.

The movement of lever 5 is preferably limited by stops and the strength of spring 9 and the size of the piston 7 are so adjusted that when the engine is running at full speed with the throttle wide open the vacuum beneath the piston 7 is sufficient to cause the ignition to be advanced to the required extent.

It will be obvious that the vacuum in the induction pipe 2 will be high at any time when the throttle is almost closed and also at high speeds of the engine even when the throttle is open. At all these times the ignition needs to be relatively advanced. If while the throttle is fully open the engine speed decreases it is desirable that the ignition should be retarded and that will be the effect of the apparatus indicated.

In some cases it may not be desirable to have the ignition fully advanced for all speeds with the throttle nearly closed. It is then preferable to connect the spring with the throttle lever at any part which moves with the throttle valve so that pull on the piston is increased as the throttle is closed.

Referring now to Fig. 2, as in the above construction, a controlling cylinder 6 is provided having a piston 7 connected with a piston rod 10 connected in its turn to the rocker 5 (Fig. 1) of the magneto 4 of the engine. As before, also, a small pipe 8 is connected to the induction pipe of the engine beyond the throttle valve 3 (Fig. 1). The piston 7 is pushed up toward the position of retarded ignition by means of a coiled spring 9, in this case within the cylinder 6. In the present instance, however, which shows a construction for engines which require a more sensitive control, the upper end of the cylinder 1 is inclosed by a cover 11, and this cover has passing through it a small pipe 12 which is connected to the exhaust pipe of the engine, so that the exhaust pressure assists the vacuum in the suction pipe to advance the spark. Thus at a high speed with the throttle valve fully open when the suction is insufficient to advance the spark, there will be a comparatively large pressure in the exhaust pipe to cause the ignition to be fully advanced. As the engine slows down the pressure in the exhaust pipe drops in proportion and allows the requisite retardation of the magneto.

In certain cases the suction from the induction pipe may be too high, and to allow for this the piston rod operating the rocker lever of the magneto may be passed through a suitable gland in the closed cover 11 and may be made of such a diameter that the ratio of the effective surface of the piston 7 upon which the exhaust pressure acts to that upon which the suction acts is made the required amount.

The invention is obviously not limited to this method of reducing the effective exhaust pressure as it is evident that this result can be attained in other ways.

Figure 3:
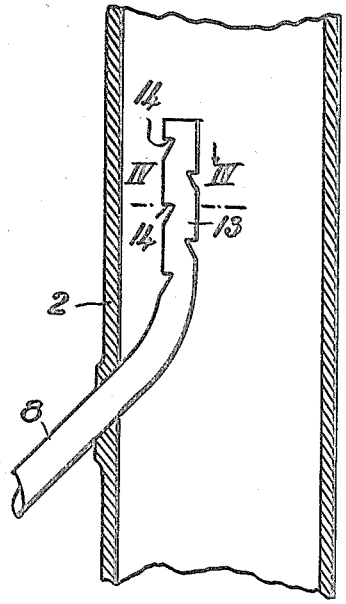
Fig. 3 is a diagrammatic section through the induction pipe of the engine showing another method of producing increase in sensitiveness.
Figure 4:
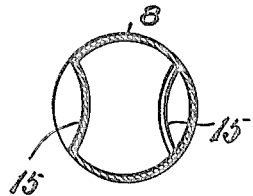
Fig. 4 is an enlarged section on the line IV—IV of Fig. 3.

Of course in some cases only a slight increase in the suction might be necessary in order successfully to operate the ignition control system, and this may be conveniently obtained by an application of the injector principle illustrated in connection with Figs. 3 and 4. For this purpose the suction pipe 8 connected to the induction pipe 2 of the engine is led a short distance inside the latter and bent upward as seen at 13 toward the engine cylinder ports. Holes 14 directed toward the engine ports are provided to increase the injector effect and the end of the pipe 8 is specially shaped, for example by indenting as shown at 15 in Fig. 4 to increase the effect also.

In many engines it is not advisable to allow the ignition to be fully advanced when the engine is running slowly on no load as already mentioned. Fig. 5 illustrates one construction for providing for this. There is, as described in connection with Figs. 1 and 2, a main controlling cylinder 6 with a piston 7 and piston rod 10 connected to the rocker lever 5 of the magneto 4 (Fig. 1), a pipe 8 connected to the induction pipe 2 of the engine and a controlling spring 9. As described above also, the opposite end of the cylinder is closed by a cover 11 carrying a small pipe 12 connected to the engine exhaust pipe. In this particular case, however, a small auxiliary cylinder 16 is provided outside the main cylinder 6 and the pipe 8 passes through a port 17 in the center of the head of the cylinder 16 and is continued by the small length of pipe 18 to the main cylinder 6. There is a further port 19 connecting the auxiliary cylinder 16 to the main cylinder 6, and the ports are so designed that this port 19 is at a certain predetermined distance from the top of the cylinder 6. The port 19, as can be seen obviously from the drawing, is covered entirely by the piston 7 when the latter rises a certain extent. The auxiliary piston 20 in the auxiliary cylinder 16 has an upward extension 21 formed as a needle valve at its extremity adapted to close the port 17. Normally, however, the piston 20 is kept down by means of a spring 22, and the strength of the spring 22 has to be such that with a predetermined vacuum in the induction pipe corresponding with a certain opening of the throttle valve the needle valve 21 is closed. This actually takes place when the engine is turning around slowly on no load and the vacuum is excessive. In these circumstances the only connection between the induction pipe of the engine and the main cylinder 6 is through the pipe 8 and port 19. Hence the piston 7 cannot pass up higher than the position in which its upper edge just fails to cover the port 19. Otherwise the spring 9 would depress the piston until it takes up this position. Therefore in these circumstances the magneto rocker lever cannot be fully advanced but only can be advanced to an extent corresponding to the position of the port 19.

The port 19 can be placed in any position between those in which the magneto is fully advanced or fully retarded, and therefore the advance of the spark when the engine is running under the conditions mentioned above can be limited to any desired position. A number of constructional modifications of this arrangement might be made. Perhaps it is sufficient to indicate that the main controlling cylinder and the auxiliary cylinder could easily be made concentric with special arrangements for the controlling ports.

Figure 6:
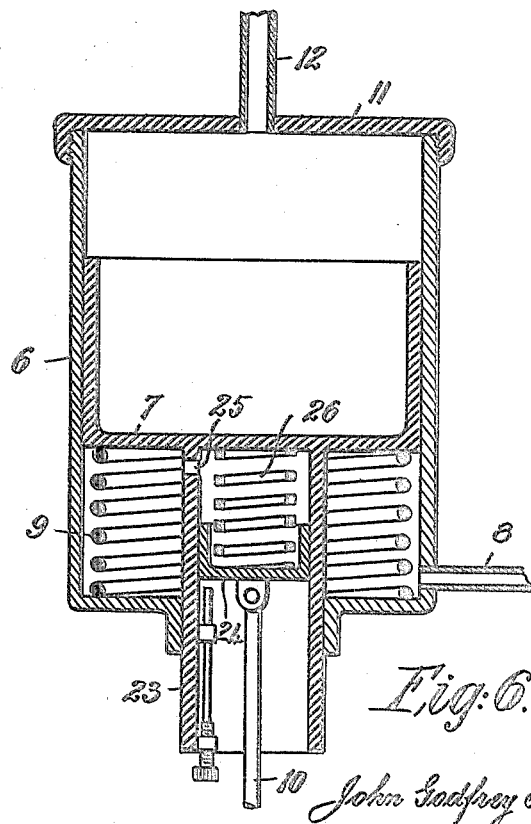
Fig. 6 is a similar view of an alternative apparatus for producing the same effect.

The construction shown in Fig. 6 is perhaps a simpler construction and therefore more reliable for obtaining the same effect as the construction shown in Fig. 5. As before, there is a main cylinder 6 carrying the piston 7. There is a rod 10 connected to the rocker lever of the magneto, a pipe 8 connecting the cylinder space with the engine induction pipe, and a spring 9 controlling the main piston 7. In this case also the other end of the cylinder 6 is closed by a cover 11 carrying a pipe 12 connected with the engine exhaust pipe. The main piston 7 has a cylindrical extension 23 adapted to slide with it in guides in the cylinder 6. The cylindrical extension 23 has an auxiliary piston 24 which in fact carries the rod 10 connected to the rocker lever. The upper part of the cylindrical extension 23 is connected by means of a port 25 with the space below the main piston 7, and therefore the space above the piston 24 is normally connected to the induction pipe 2 of the engine. The auxiliary piston 24 is pushed downward by means of a spring 26 which has to be of the necessary strength to fulfil the conditions set out below.

In normal working the suction communicated by the pipe 8 is not sufficient materially to compress the spring 26, but it can draw down the main piston 7 which therefore slides solid with the parts 26, 24 and 10 so that under normal conditions the whole device operates as described in connection with the apparatus described in Fig. 1. When the engine, however, is on very light load with the throttle open only to a very small extent there is a much larger suction communicated by the pipe 8, and the spring 26 is practically fully compressed so that although the main piston 7 is in the fully advanced position the auxiliary piston 24 retards the ignition to any predetermined extent.

In this arrangement a pipe 12 connected to the exhaust of the engine is described and if desired instead of being connected direct a suitable non-return valve can be inserted which can conveniently be adjusted to allow any desired amount of pressure to pass from the exhaust pipe up to the maximum obtainable. This arrangement again allows of considerable variation without doing away with the main principles involved.

The method of controlling the ignition in accordance with the invention may be used in conjunction with a centrifugal device acting upon the magneto rocker. The effects of the two devices may be independent or additive.

What I claim is:

1. In an internal combustion or like engine the combination of an ignition device controlling mechanism therefor, a control cylinder, a movable member in said cylinder in mechanical connection with said controlling mechanism and a pipe joining said cylinder to the intake of the engine and of substantial negligible volume relatively to that of said cylinder.

2. In an internal combustion or like engine, the combination of an ignition device, controlling mechanism therefor, apparatus sensitive to changes in the intake suction connected mechanically with said ignition controlling mechanism, a connecting pipe between said apparatus and the engine induction pipe, and means for throttling said pipe under pre-determined conditions.

3. In an internal combustion or like engine the combination of an ignition magneto, an auxiliary cylinder, a pipe connecting said auxiliary cylinder with the intake of the engine and of substantially negligible volume relatively to said cylinder, a member for controlling the time of ignition due to said magneto, and a piston adapted to slide in said cylinder and operatively connected to said ignition controlling member.

4. In an internal combustion or like engine the combination of an ignition device, controlling mechanism therefor, apparatus sensitive to changes in the vacuum in the engine pipe and also sensitive to changes in the engine exhaust pressure, and an operative connection between said apparatus and said ignition controlling mechanism.

5. In an internal combustion or like engine, the combination of an ignition system, means for controlling the ignition, an auxiliary cylinder, a piston in said cylinder allowing a cylinder space on either side of it, a pipe connection between the engine induction pipe and one of said cylinder spaces, a pipe connection between the engine exhaust pipe and the other of said cylinder spaces and a link connecting said piston with said ignition controlling mechanism.

6. In an internal combustion or like engine the combination of a member movable in accordance with variations in the vacuum in the engine induction pipe, apparatus for providing ignition for the engine, a movable ignition adjusting device, mechanical connection between said device and said moving member, and means for limiting the movement of said device when the engine throttle is almost closed.

7. In an internal combustion or like engine, the combination of a device sensitive to changes of pressure, ignition apparatus, means for controlling the ignition, an operative connection between said means and said device sensitive to pressure, and an injector pipe leading from said sensitive device to the engine induction pipe and projecting into the latter, the end of said pipe in the engine induction pipe being formed to increase the injector effect.

8. In an internal combustion or like engine, an ignition device, controlling mechanism therefor, a controlling cylinder, a movable member therein in operative connection with said controlling mechanism, a pipe connecting said cylinder with the engine induction pipe, and means for closing said pipe actuated by excessive intake suction.

9. In an internal combustion or like engine, the combination of a magneto effecting ignition in the engine, a rocker lever upon said magneto movable to vary the timing of the ignition, means operable by the intake suction for moving said lever and means operated by excessive intake suction for rendering said first-named means inoperative.

10. In an internal combustion or like engine the combination of a member movable in accordance with variations in the vacuum in the engine induction pipe, apparatus for providing ignition for the engine, a movable device for advancing the time of ignition in the engine, a mechanical connection between said device and said moving member and means for reducing the effect of advance of the ignition when the latter has been advanced a pre-determined amount.

11. In an internal combustion or like engine, the combination of a member movable in accordance with variations in the vacuum in the engine induction pipe, apparatus for providing ignition for the engine, a movable ignition adjusting device, a mechanical connection between said device and said moving member, and means operated by the vacuum in the engine induction pipe for limiting the possible advance of the ignition when said vacuum exceeds a predetermined maximum.

12. In an internal combustion or like engine, the combination of an ignition system, a member adapted to adjust the timing of the ignition, a controlling cylinder and piston, the latter moving in accordance with variations in the vacuum in the engine induction pipe, a mechanical connection between said piston and the ignition adjusting member, and means for limiting the effective movement of said piston to advance the ignition under predetermined conditions.

13. In an internal combustion or like engine, the combination of an ignition system, a member adapted to adjust the timing of the ignition, a controlling cylinder and piston, the latter moving in accordance with variations in the vacuum in the engine induction pipe, a mechanical connection between said piston and the ignition adjusting member, a second piston capable of differential movement with respect to the first-named piston, and means for only allowing the second-named piston to come into action under predetermined conditions.

14. In an internal combustion or like engine, the combination of an ignition system, a member adapted to adjust the timing of the ignition, a controlling cylinder and piston, the latter moving in accordance with variations in the vacuum in the engine induction pipe, a mechanical connection between said piston and the ignition adjusting member, a second piston capable of movement differentially with respect to that of said first-named piston, a spring resisting the movement of said second-named piston of such strength as only to permit material movement of the latter under predetermined conditions.

15. In an internal combustion or like engine, the combination of an ignition system, a member adapted to adjust the timing of the ignition, a controlling cylinder and piston, the latter moving in accordance with variations in the vacuum in the engine induction pipe, a mechanical connection between said piston and the ignition adjusting member, a cylindrical extension upon the back of said control piston, an auxiliary piston moving in said cylindrical extension differentially with respect to said control piston, means for communicating the suction in the engine induction pipe to the cylinder space in said cylindrical extension, a spring opposing the movement of said auxiliary piston of such strength as to allow only material movement of the latter when the vacuum in the engine induction pipe exceeds a predetermined maximum.

16. In an internal combustion engine, the combination of a magneto for effecting ignition of the engine, a rocker lever upon said magneto movable to advance and retard the ignition, a main control cylinder mounted upon the frame of said engine and closed at both ends, a piston sliding in said control cylinder, a spring tending to press said piston upward, a pipe connecting the engine exhaust pipe with the cylinder space above said piston, a pipe connecting the engine induction pipe to the cylinder space below said piston, a cylindrical extension depending from said piston making joint with and being guided in the lower closed end of said control cylinder and being provided with a port adjacent to said piston connecting the interior of said cylinder extension with the cylinder space below said piston and therefore with the induction pipe, an auxiliary piston in said cylindrical extension, a rod linking said auxiliary piston with a magneto rocker lever and a control spring acting between said auxiliary piston and said first-named piston of such a strength that there is no material relative movement between said two pistons except when the suction in the engine induction pipe is abnormally high.

17. In an internal combustion engine, the combination of automatic means, independent of the engine-throttle when the engine is under working load, for varying the time of ignition and further means controlled directly by the engine-throttle for retarding the ignition as the throttle approaches idling position.

18. In an internal combustion or like engine the combination of a member movable in accordance with variations in the vacuum in the engine induction pipe, apparatus for providing ignition for the engine, means for advancing the time for ignition in the engine in operative connection with said movable member, and means for neutralizing the effect of said ignition advancing means under predetermined conditions.

In testimony whereof I have signed my name to this specification.

J. G. P. THOMAS.